126. STOVES & FURNACES,
Hot air furnaces.
Combined with boiler.
BEST AVAILABLE COPY
Leeds & Smith,
Steam Heater.
No. 131. (Ill.) Patented Feb. 5. 1855.
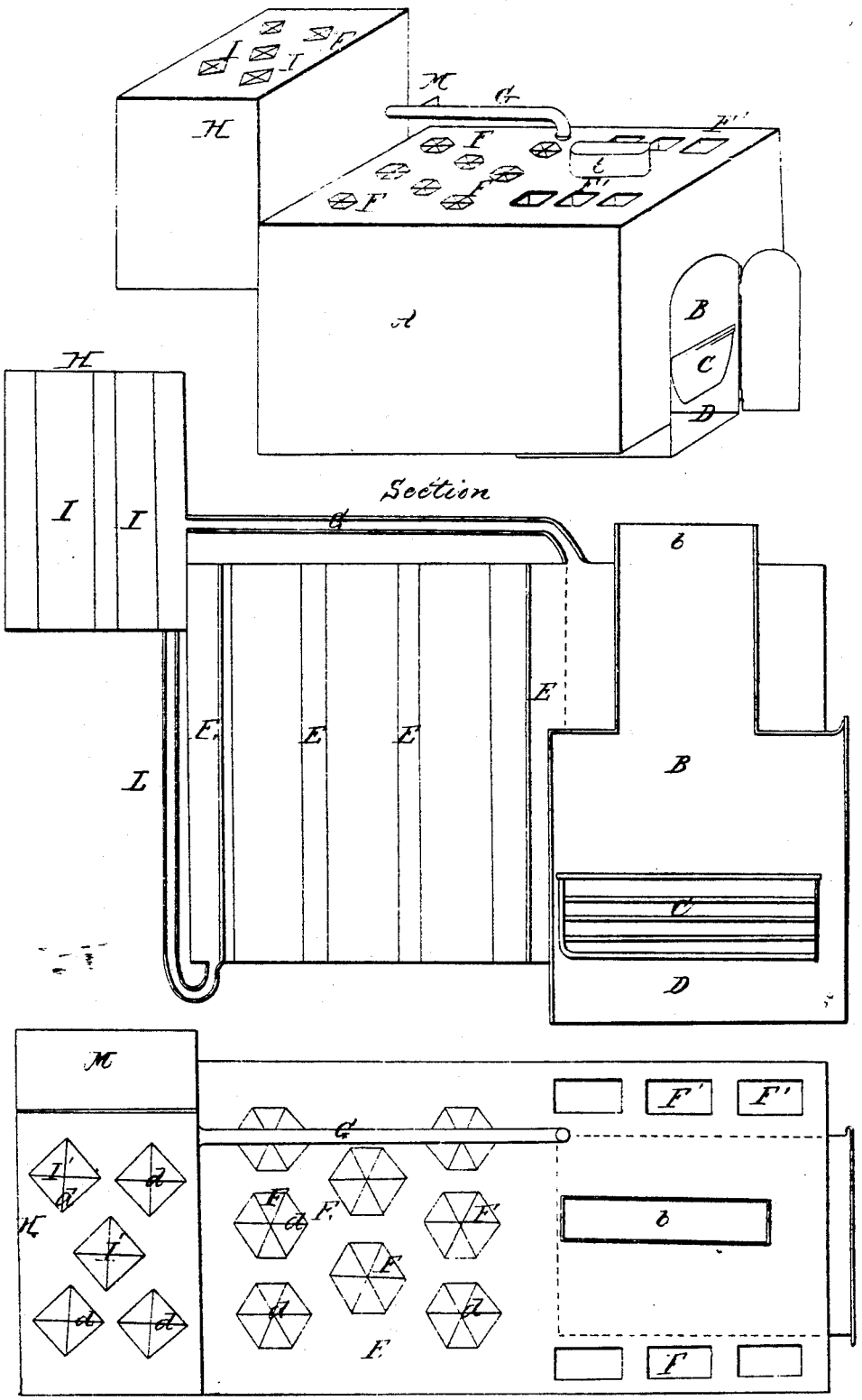
N. PETERS, PHOTO-LITHOGRAPHER, WASHINGTON D. C.